(12) United States Patent
Fukushima et al.

(10) Patent No.: US 12,353,701 B2
(45) Date of Patent: Jul. 8, 2025

(54) INFORMATION PROCESSING DEVICE AND INFORMATION PROCESSING PROGRAM CAPABLE OF DISPLAYING A PORTION THAT DOES NOT FIT WITHIN A SCREEN WHEN A USER PERFORMS A CONTINUOUS OPERATION

(71) Applicant: FUJIFILM CORPORATION, Tokyo (JP)

(72) Inventors: Tatsuo Fukushima, Kanagawa (JP); Yuji Onozawa, Kanagawa (JP); Takafumi Haruta, Kanagawa (JP); Yohei Makino, Kanagawa (JP)

(73) Assignee: FUJIFILM CORPORATION, Tokyo (JP)

(*) Notice: Subject to any disclaimer, the term of this patent is extended or adjusted under 35 U.S.C. 154(b) by 0 days.

(21) Appl. No.: 18/264,251

(22) PCT Filed: Jan. 31, 2022

(86) PCT No.: PCT/JP2022/003674
§ 371 (c)(1),
(2) Date: Aug. 4, 2023

(87) PCT Pub. No.: WO2022/176590
PCT Pub. Date: Aug. 25, 2022

(65) Prior Publication Data
US 2024/0086058 A1 Mar. 14, 2024

(30) Foreign Application Priority Data
Feb. 17, 2021 (JP) .................................. 2021-023746

(51) Int. Cl.
*G06F 3/0488* (2022.01)
*G06F 3/0483* (2013.01)
(Continued)

(52) U.S. Cl.
CPC ........ *G06F 3/04855* (2013.01); *G06F 3/0483* (2013.01); *G06F 3/0488* (2013.01); *G06F 9/451* (2018.02); *H04N 1/00482* (2013.01)

(58) Field of Classification Search
None
See application file for complete search history.

(56) References Cited

U.S. PATENT DOCUMENTS

2012/0262742 A1* 10/2012 Yano .................... G03G 15/502
358/1.9
2014/0331164 A1 11/2014 Enomoto et al.
(Continued)

FOREIGN PATENT DOCUMENTS

JP 2004-030165 A 1/2004
JP 2007-069513 A 3/2007
(Continued)

*Primary Examiner* — Rinna Yi
(74) *Attorney, Agent, or Firm* — SOLARIS Intellectual Property Group, PLLC

(57) ABSTRACT

An information processing device includes a processor, in which the processor causes an operation part for executing a predetermined function and relevant information related to the predetermined function to be displayed on a screen of a display, accepts execution of the predetermined function by a continuous operation on the operation part, and changes a portion of the relevant information to be displayed on the screen according to progress of the continuous operation on the operation part during a period from the start of the operation on the operation part to the acceptance of the execution.

11 Claims, 9 Drawing Sheets

(51) Int. Cl.
*G06F 3/04855* (2022.01)
*G06F 9/451* (2018.01)
*H04N 1/00* (2006.01)

(56) References Cited

U.S. PATENT DOCUMENTS

| | | | |
|---|---|---|---|
| 2015/0040024 A1 | 2/2015 | Higashibeppu | |
| 2015/0089441 A1* | 3/2015 | Sakayanagi | G06F 3/04855 |
| | | | 715/786 |
| 2016/0072970 A1* | 3/2016 | Kimoto | H04N 1/00408 |
| | | | 358/1.13 |
| 2017/0003921 A1* | 1/2017 | Ge | G06F 3/1267 |
| 2019/0220170 A1 | 7/2019 | Zhang et al. | |
| 2020/0326834 A1* | 10/2020 | Lemmens | G06F 3/04883 |

FOREIGN PATENT DOCUMENTS

| | | |
|---|---|---|
| JP | 4116345 B2 | 7/2008 |
| JP | 2010-122809 A | 6/2010 |
| JP | 5585683 B1 | 9/2014 |
| WO | 2013/039046 A1 | 3/2013 |

\* cited by examiner

INFORMATION PROCESSING DEVICE AND INFORMATION PROCESSING PROGRAM CAPABLE OF DISPLAYING A PORTION THAT DOES NOT FIT WITHIN A SCREEN WHEN A USER PERFORMS A CONTINUOUS OPERATION

TECHNICAL FIELD

The present disclosure relates to an information processing device and an information processing program.

BACKGROUND ART

Japanese Patent Application Laid-Open (JP-A) No. 2004-30165 discloses a user interface as setting means (a screen mainly constructed by a graphics user interface (GUI)) that designates a control method for a peripheral device such as a printer device, or an environment, an operation, or the like of a computer terminal device (hereinafter, referred to as a computer) on the computer connected to the peripheral device, the user interface includes means that stores a setting content set on the user interface as the setting means, means that acquires the setting content stored by the storage means, and means that displays a function description, a supplementary note, or the like related to a setting item on the user interface as the setting means as an item such as a text or a figure on the user interface as the setting means having the setting item, and the user interface includes means that determines whether or not an item highlighted for a notification to a user exists among items displayed by the display means according to a setting change on the user interface as the setting means, and means that determines a display state of the item highlighted for a notification on the user interface as the setting means in a case in which the item highlighted for a notification exists according to a result of the determination performed by the determination means as to whether or not an item highlighted for a notification exists, in which the display means displays the item highlighted for a notification corresponding to the result of the determination performed by the determination means.

JP-A No. 2010-122809 discloses an information processing device including setting means that sets a condition of printing processing in an image forming device as a first printing setting according to an instruction from a user, holding means that holds a second printing setting that is an initial value of a printing setting before customization and a third printing setting that is an initial value of a printing setting after customization, determination means that determines whether or not the first printing setting and the second printing setting are the same for each item of the printing setting, and further determines whether or not the first printing setting and the third printing setting are the same for each item of the printing setting, and display control means that causes display means to display a result obtained by the determination means in an identifiable manner.

JP-A No. 2007-69513 discloses a printing processing device including setting operation screen display means that displays a setting operation screen for referring to and changing setting items of various functions necessary for printing, and setting result list screen display means that displays a list of set results in such a way as not to overlap with the setting operation screen.

Japanese Patent Publication (JP-B) No. 4116345 discloses a printing information setting device including means that displays, on a display, a setting operation screen for changing various conditions necessary for printing from standard settings according to a content of each tab by selecting an arbitrary tab from among a plurality of tabs, means that displays a setting result display screen for displaying a setting result set on the setting operation screen at the same portion on the display side by side with the setting operation screen regardless of the tap selected from among the plurality of tabs, means that is fixedly arranged in the vicinity of the setting result display screen and switches whether to display setting results of printing information on the setting result display screen in a comprehensive illustration form or to display the setting results of the printing information on the setting result display screen in a list form using a text, means that displays only a content of the change from the standard settings on the setting result display screen together with names of the plurality of tabs in a state in which the setting results are displayed in the list form using a text on the setting result display screen, and means that switches the setting operation screen to a setting operation screen corresponding to a selected tab when any one of the names of the respective tabs displayed in a list form is selected in a state in which the setting results are displayed in the list form using a text on the setting result display screen.

SUMMARY OF INVENTION

Technical Problem

Functions of devices and applications are diversified. With the diversification of functions, the amount of relevant information related to the functions, for example, information indicating settings for the functions, also increases. As a result, all the pieces of relevant information, for example, all of the settings do not fit into one screen of a display in some cases.

When a user performs a continuous operation on an operation part in order to execute a function, for example, when execution of a function is accepted by a swiping motion, the user can view only a part of the relevant information displayed on the screen, and cannot view a part that does not fit within the screen in some cases.

Therefore, an object of the disclosure is to provide an information processing device and an information processing program capable of displaying a portion that does not fit within a screen when a user performs a continuous operation on an operation part to execute a function.

Solution to Problem

An information processing device according to a first aspect includes a processor, in which the processor causes an operation part for executing a predetermined function and relevant information related to the predetermined function to be displayed on a screen of a display, accepts execution of the predetermined function by a continuous operation on the operation part, and changes a portion of the relevant information to be displayed on the screen according to progress of the continuous operation on the operation part during a period from the start of the operation on the operation part to the acceptance of the execution.

An information processing device according to a second aspect is the information processing device according to the first aspect, in which the processor changes a portion to be displayed on the screen by scrolling or performing pagination according to the progress of the operation on the operation part.

An information processing device according to a third aspect is the information processing device according to the first aspect or the second aspect, in which the processor reverses a change of display of the screen in a case in which the operation on the operation part is reversed during the period from the start of the operation on the operation part to the acceptance of the execution.

An information processing device according to a fourth aspect is the information processing device according to any one of the first to third aspects, in which the processor links a speed of the operation on the operation part with a speed for sequentially changing the portion to be displayed on the screen.

An information processing device according to a fifth aspect is the information processing device according to any one of the first to fourth aspects, in which the relevant information includes first information and second information different from the first information, and the processor causes the first information to be displayed on the screen before starting the operation on the operation part, and causes the second information to be displayed on the screen during the period from the start of the operation on the operation part to the acceptance of the execution.

An information processing device according to a sixth aspect is the information processing device according to the fifth aspect, in which the processor causes information indicating a change from an initial setting for executing the predetermined function to be displayed as the second information.

An information processing device according to a seventh aspect is the information processing device according to the fifth aspect or the sixth aspect, in which the processor keeps the second information displayed in a case in which the operation on the operation part is reversed and the operation is maintained during the period from the start of the operation on the operation part to the acceptance of the execution.

An information processing device according to an eighth aspect is the information processing device according to any one of the fifth to seventh aspects, in which the processor returns the display from the second information to the first information in a case in which the operation on the operation part is canceled during the period from the start of the operation on the operation part to the acceptance of the execution.

An information processing device according to a ninth aspect is the information processing device according to any one of the fifth to eighth aspects, in which the processor keeps the second information displayed in a case in which the operation on the operation part is canceled after the execution of the predetermined function is accepted by the operation on the operation part.

An information processing device according to a tenth aspect is the information processing device according to any one of the fifth to ninth aspects, in which there are a plurality of types of the second information, and the processor changes the second information to be displayed on the screen according to the speed of the operation on the operation part.

An information processing device according to an eleventh aspect is the information processing device according to the tenth aspect, in which the processor causes the second information to be displayed on the screen in a case in which the speed of the operation is lower than a predetermined speed, and does not cause the second information to be displayed on the screen in a case in which the speed of the operation is equal to or higher than the predetermined speed.

An information processing program according to a twelfth aspect causes a computer to execute: causing an operation part for executing a predetermined function and relevant information related to the predetermined function to be displayed on a screen of a display; accepting execution of the predetermined function by a continuous operation on the operation part; and changing a portion of the relevant information to be displayed on the screen according to progress of the continuous operation on the operation part from the start of the operation on the operation part to the acceptance of the execution.

Advantageous Effects of Invention

With the information processing device according to the first aspect, even in a case in which all the pieces of relevant information related to a function of a device or an application do not fit into one screen of the display, it is possible to display a portion that does not fit within the screen.

With the information processing device according to the second aspect, switching of the relevant information in the display of the screen can be changed in stages.

With the information processing device according to the third aspect, the relevant information switched in the display of the screen is returned to the display of the screen before switching, and the relevant information can be viewed again.

With the information processing device according to the fourth aspect, a switching speed for the relevant information in the display of the screen can be changed according to the speed of the operation on the operation part.

With the information processing device according to the fifth aspect, in a case in which there is relevant information including the first information and the second information different from the first information, the type of the relevant information to be displayed on the screen can be changed in stages by the operation on the operation part.

With the information processing device according to the sixth aspect, a change from the initial setting for executing the predetermined function can be displayed in an easy-to-understand manner as the second information to be displayed on the screen.

With the information processing device according to the seventh aspect, in a case in which the operation is reversed and the operation is maintained during the period from the start of the operation on the operation part to the acceptance of the execution, the display of the second information displayed on the screen can be kept.

With the information processing device according to the eighth aspect, in a case in which the operation is canceled during the period from the start of the operation on the operation part to the acceptance of the execution, the display of the screen can be returned from the display of the second information to the display of the first information.

With the information processing device according to the ninth aspect, after the execution of the predetermined function is confirmed, the display of the second information can be kept without switching the display of the screen.

With the information processing device according to the tenth aspect, the type of the second information to be displayed on the screen can be changed according to the speed of the operation on the operation part.

With the information processing device according to the eleventh aspect, it is possible to change the type of information displayed on the screen in a case in which the speed of the operation is lower than the predetermined speed, and not to change the type of information displayed on the screen in a case in which the speed of the operation is equal to or higher than the predetermined speed.

With the information processing program according to the twelfth aspect, even in a case in which all the pieces of relevant information related to a function of a device or an application do not fit into one screen of the display, it is possible to display a portion that does not fit within the screen.

DESCRIPTION OF EMBODIMENTS

Hereinafter, an example of an embodiment according to the disclosed technology will be described in detail with reference to the drawings.

First Embodiment

Figure 1:
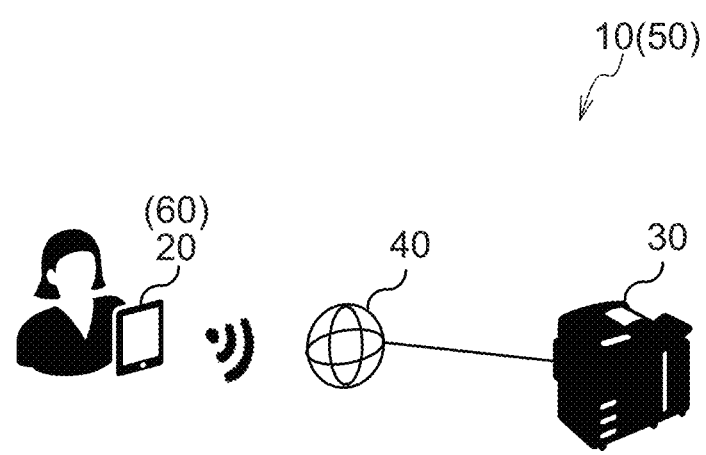
FIG. 1 is a diagram showing a schematic configuration of an information processing system 10 and an information processing system 50 according to the present embodiment.

FIG. 1 is a diagram showing a schematic configuration of an information processing system 10 according to the present embodiment. Here, an environment to which the information processing device 20 according to the present embodiment is applied is shown. In the present embodiment, the information processing device 20 is a device connectable to an image forming device 30 or a device applied to the device as shown in FIG. 1.

Examples of the information processing device 20 include a portable terminal such as a smartphone or a tablet terminal, or a fixed terminal such as a personal computer. In the present embodiment, a case in which the information processing device 20 is a tablet terminal will be described as an example. The information processing device 20 includes a display.

The display can display various types of information and functions as an output device. The display as a touch panel also functions as an input device. The information processing device 20 receives an input by an operation such as touching a screen of the display with a finger tip of the user or a dedicated pen, and outputs the screen to be displayed according to the operation. For example, an input screen for an image formation setting in the image forming device 30 is displayed on the display, and the user can input or select the setting. An input/output device may be divided into separate input and output devices depending on the respective functions.

The information processing device 20 is connected to the image forming device 30 via a network 40. Examples of the network include the Internet, a local area network (LAN), and a wide area network (WAN).

The image forming device 30 executes image forming processing involving image formation such as printing, scanning, copying, or facsimile transmission based on an instruction from the information processing device 20.

Figure 2:
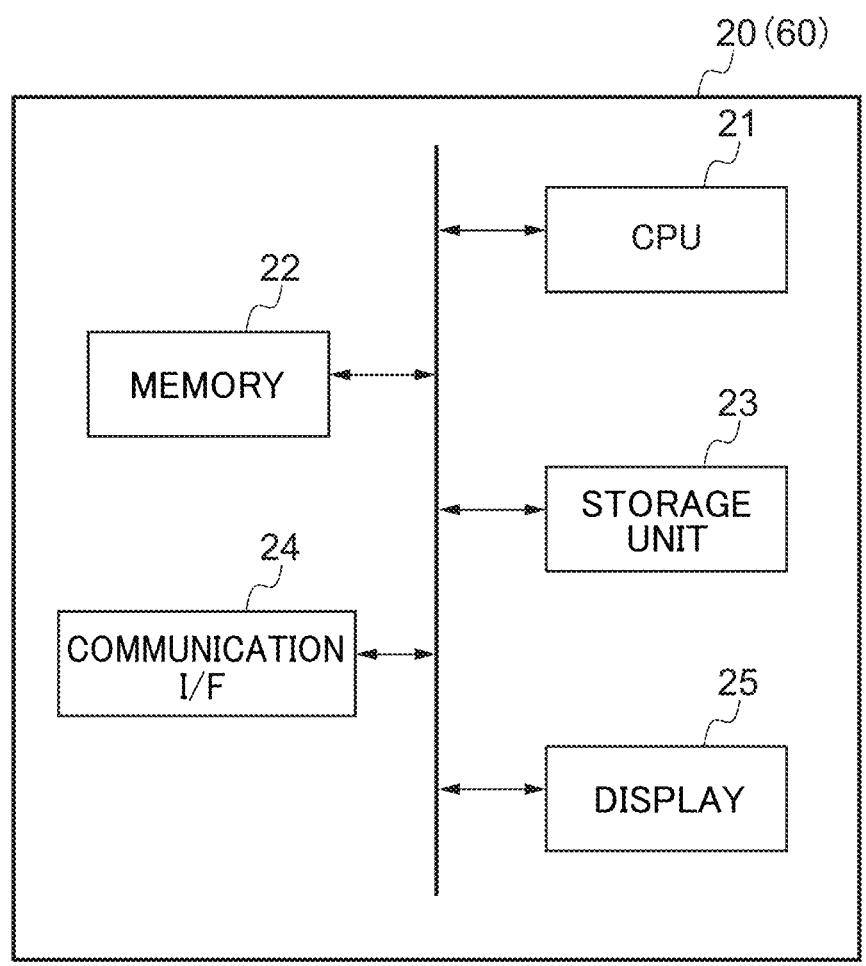
FIG. 2 is a block diagram showing a hardware configuration of an information processing device 20 and an information processing device 60 according to the present embodiment.

Next, a hardware configuration of the information processing device 20 according to the present embodiment will be described. FIG. 2 is a block diagram showing the hardware configuration of the information processing device 20 according to the present embodiment.

As shown in FIG. 2, the information processing device 20 includes a central processing unit (CPU) 21, a memory 22, a storage unit 23, a communication interface (I/F) 24, and a display 25 (an input unit and an output unit).

The CPU 21 is a central processing unit, and executes various programs and controls each component. That is, the CPU 21 reads a program from the storage unit 23 and executes the program using the memory 22 as a work area. The CPU 21 controls each of the components and executes various types of arithmetic processing according to a program stored in the storage unit 23.

The memory 22 is implemented by a random access memory (RAM), and temporarily stores a program and data, as a work area. The storage unit 23 is implemented by a read only memory (ROM), a hard disk drive (HDD), a solid state drive (SSD), or the like, and stores various programs including an operating system and various data.

The communication I/F 24 is an interface for communicating with other devices, and for example, standards such as Ethernet (registered trademark), FDDI, or Wi-Fi (registered trademark) are used.

As described above, the display 25 is configured as, for example, a touch panel to function as an output unit that displays a screen and an input unit that receives an input from a user. In a case in which the display 25 only functions as the output unit that displays a screen, the information processing device 20 may include an input device for various inputs, such as a keyboard or a mouse.

Figure 3:
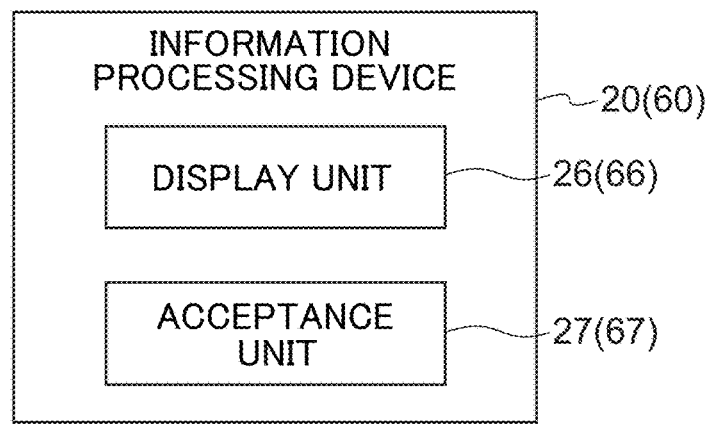
FIG. 3 is a block diagram showing a functional configuration of the information processing device 20 and the information processing device 60 according to the present embodiment.

Next, a functional configuration of the information processing device 20 according to the present embodiment will be described. FIG. 3 is a block diagram showing the functional configuration of the information processing device 20.

As shown in FIG. 3, the information processing device 20 includes a display unit 26 and an acceptance unit 27 as the functional configuration. The functional configuration is implemented by the CPU 21 reading an information processing program from the storage unit 23, loading the information processing program into the memory 22, and executing the information processing program.

The display unit 26 displays an operation part for executing a predetermined function and relevant information related to the predetermined function on the screen of the display 25. The acceptance unit 27 accepts execution of the predetermined function by a continuous operation on the operation part. The display unit 26 changes a portion of the relevant information to be displayed on the screen according to progress of the continuous operation on the operation part from the start of the operation on the operation part accepted by the acceptance unit 27 to the acceptance of the execution.

Here, the predetermined function is a function related to image formation in the image forming device 30, such as printing, scanning, copying, or facsimile transmission.

The relevant information related to the predetermined function is information related to the predetermined function, and is, for example, setting information related to execution of the predetermined function. The setting information related to execution of the predetermined function may be either information of an initial setting or information of a change from the initial setting. The relevant information related to the predetermined function may include a plurality of types of information as described below, and may be not only setting information before execution of the predetermined function but also information related to a state of the image forming device 30 after execution of the predetermined function, a result associated with the execution, or the like.

Figure 4:
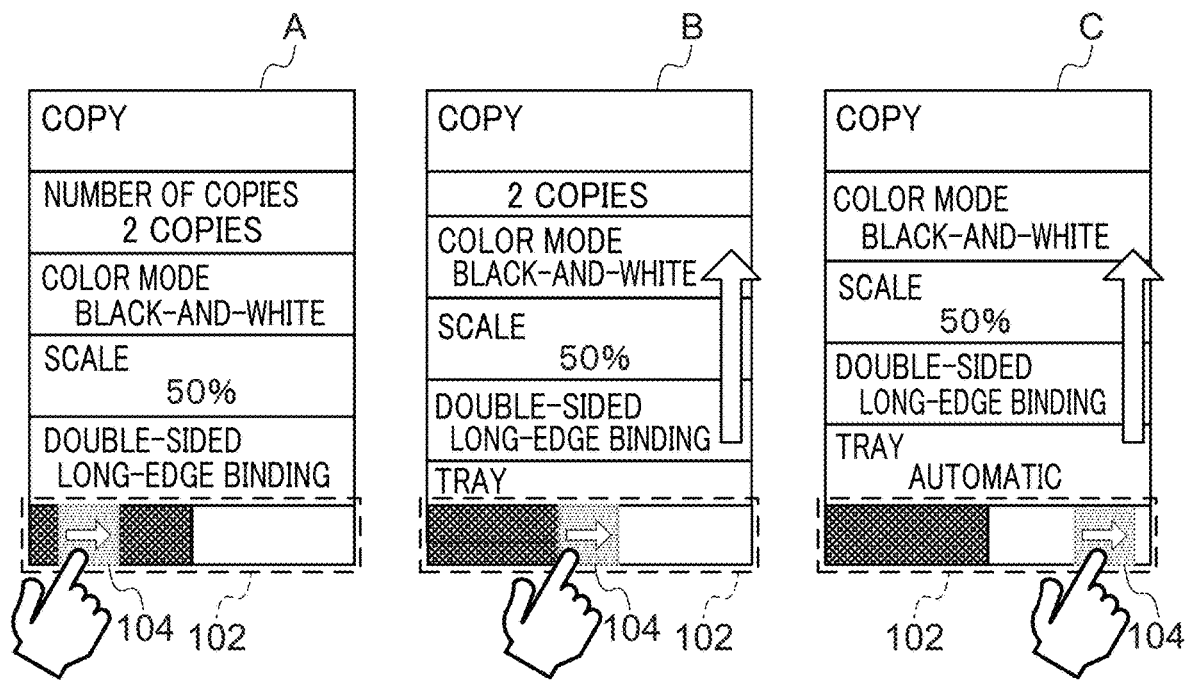
FIG. 4 is a diagram showing an example of display of the information processing device 20 according to a first embodiment.

The operation part for executing the predetermined function, displayed on the screen of the display 25 by the display unit 26 is a portion that is displayed on the display 25 and accepts an input by a touch operation of the user, like, for example, an operation part 102 shown in FIG. 4.

The continuous operation on the operation part is an operation including a motion of maintaining a selected state of the operation part. Examples of the continuous operation on the operation part include an operation in which the user slides an operation button 104 in the operation part 102 from the left to the right with the finger or the like as shown in FIG. 4. In the present embodiment, a case in which the continuous operation is an operation in which the user slides the operation button 104 in the operation part 102 from the left to the right with the finger or the like will be described. However, the continuous operation on the operation part is not limited to an example such as sliding or swiping. Variations of the continuous operation on the operation part will be described below with reference to FIGS. 9 and 10.

FIG. 4 is a diagram showing an example of display of the information processing device 20 according to the present embodiment. FIGS. 4A to 4C show an example of a screen displayed as the relevant information related to the predetermined function on the display 25 by the display unit 26.

FIG. 4A shows an example of a screen that displays setting information for copying as the predetermined function to be executed by the image forming device 30. In FIG. 4A, a setting in which the number of copies is two, a color mode is a black-and-white mode, a scale is 50%, and an output tray is automatically allocated is displayed as the relevant information related to the predetermined function.

The operation part 102 is displayed on the lower side of FIG. 4A. As described above, the operation part 102 is displayed for the user to perform the operation for executing the predetermined function, the operation part 102 is displayed as a scroll bar as an example shown in FIG. 4A, and the operation part 102 includes the operation button 104 for switching the display. The user changes the relevant information displayed on the display 25 by performing a predetermined operation on the operation button 104 in the operation part 102. The operation button 104 may be displayed outside the operation part 102, and the display of the operation part 102 is not limited to the scroll bar.

In FIG. 4B, as the continuous operation on the operation part, the user slides the operation button 104 in the operation part 102 from the left to the right with the finger, thereby switching the relevant information to be displayed on the display 25 and displaying the relevant information. Specifically, as items displayed on the display 25 move upward according to the sliding of the operation button 104, an item that does not fit within the screen in FIG. 4A is gradually displayed.

In FIG. 4C, the user slides the operation button 104 in the operation part 102 further rightward than in FIG. 4B to advance the operation. As a result, in FIG. 4C, the relevant information that is not visible in the screen all at once in FIG. 4B is sequentially switched and displayed according to the progress of the operation by the user.

FIGS. 4B and 4C show an example in which the relevant information that is not visible in the screen all at once is sequentially switched and displayed according to the progress of the operation by the user. Up to a setting for double-sided printing is visible in FIG. 4B, whereas relevant information related to the output tray, which is setting information that is not visible in FIG. 4B, is displayed in FIG. 4C. On the other hand, an item related to the number of copies is moved upward in the screen by scrolling and thus becomes not visible.

In addition, the display unit 26 changes a portion to be displayed on the screen by scrolling or performing pagination according to the progress of the operation on the operation part 102. In a case in which the acceptance unit 27 accepts a reversal of the operation by the user, the display unit 26 also sequentially displays a reversal of the display of the screen by scrolling. In addition, in the case of changing according to the pagination, the display unit 26 also displays the reversal of the display of the screen by switching the screen.

An example of screen transition in FIG. 4 is a scroll type as a change of a portion of the relevant information to be displayed on the display 25. In the case of the scroll-type screen transition, the setting item gradually changes according to the progress of the operation by the user, and thus, the setting item may become not visible as shown in FIG. 4. In a case in which the relevant information to be displayed on the display 25 is changed by pagination, the relevant information to be displayed on the display 25 may be changed and switched for each page. Here, the pagination means an operation of turning each page of a document or the like obtained by dividing information into a plurality of pages in consideration of ease of display.

FIG. 4 shows a case in which the screen transitions from FIG. 4A to FIG. 4B and from FIG. 4B to FIG. 4C according to the progress of the predetermined operation by the user, but the change of the portion of the relevant information to be displayed on the display 25 is not limited thereto.

When the user advances the operation on the operation button 104 further rightward than FIG. 4C with the finger, that is, when the progress of the operation by the user reaches a predetermined prescribed value, the information processing device 20 accepts execution of the predetermined function. In the example of FIG. 4, when the user slides the operation button 104 in the operation part 102 with the finger from the left to the right and advances the sliding to a predetermined reference value, the information processing device 20 accepts execution of a copying function that is the predetermined function. When the information processing device 20 accepts execution of the copying function that is the predetermined function, the image forming device 30 starts execution of the copying function that is the predetermined function based on an instruction from the information processing device 20.

In addition, in a case in which the acceptance unit 27 has accepted a reversal of the operation on the operation part 102 during a period from the start of the operation on the operation part 102 to the acceptance of the execution, the display unit 26 reverses the change of the display of the screen.

In the example shown in FIG. 4, the reversal of the operation on the operation part 102 accepted by the acceptance unit 27 means that the user slides the operation button 104 in the operation part 102 with the finger from the right to the left, which is a direction opposite to a predetermined traveling direction.

Reversing the change of the display of the screen means returning the display of the screen shown in FIGS. 4B and 4C to an original display before the acceptance unit 27 accepts the reversal of the operation in the example shown in FIG. 4. In the same manner as the change of sequentially switching and displaying according to the progress of the operation by the user, the portion of the relevant information to be displayed on the display 25 also changes in a reverse manner according to the reversal of the operation by the user.

For example, in FIG. 4, reversing the operation from the state of FIG. 4C means returning to the screen displayed in the state of FIG. 4B or the state of FIG. 4A, and reversing the operation from the state of FIG. 4B includes returning to the display in FIG. 4A.

In addition, the display unit 26 links the speed of the operation on the operation part 102 accepted by the acceptance unit 27 with the speed for sequentially changing the portion to be displayed on the screen. The speed of the transition of the screen and the speed of the operation are linked by changing the speed for sequentially changing the portion to be displayed on the screen based on the speed of the operation accepted by the acceptance unit 27. At this time, it is a matter of course that the speed of transition of the screen increases as the speed of the operation increases, and the speed of transition of the screen may decrease as the speed of the operation increases.

Next, an operation of the information processing device 20 according to the present embodiment will be described.

Figure 5:
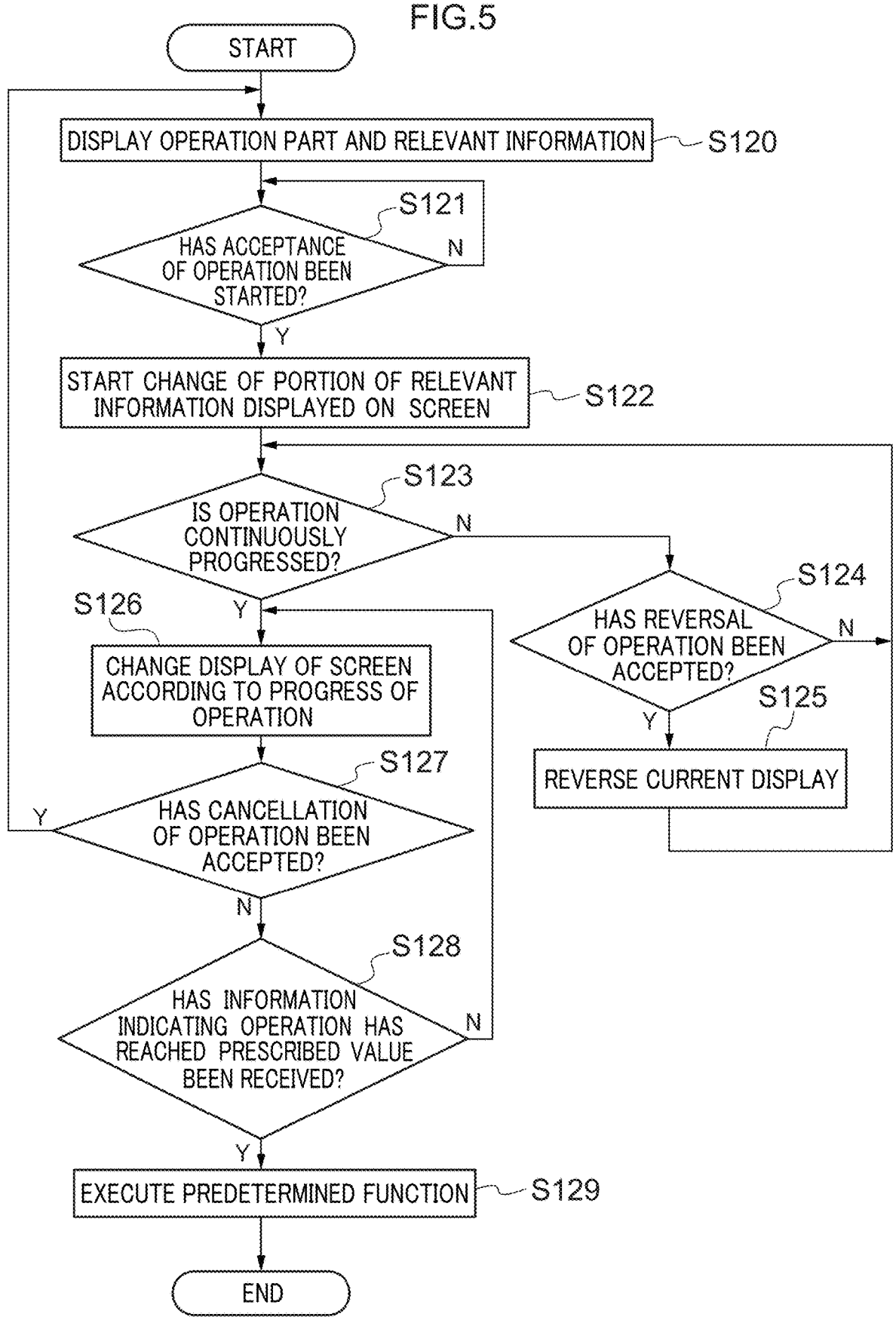
FIG. 5 is a flowchart showing processing in the information processing device 20 according to the first embodiment.

FIG. 5 is a flowchart showing processing in the information processing device 20 according to the present embodiment.

In step S120, the CPU 21 displays the operation part 102 for executing the predetermined function and the relevant information related to the predetermined function on the display 25 as the display unit 26.

In step S121, the CPU 21 as the acceptance unit 27 determines whether or not acceptance of the operation on the operation part 102 has started. In a case in which the CPU 21 as the acceptance unit 27 has started the acceptance of the operation on the operation part 102 by the user, the processing proceeds to step S122. On the other hand, in a case in which the CPU 21 as the acceptance unit 27 has not started the acceptance of the operation on the operation part 102, the processing returns to step S121.

In step S122, the CPU 21 as the display unit 26 starts a change of a portion of the relevant information to be displayed on the screen of the display 25.

In step S123, the CPU 21 as the acceptance unit 27 determines whether or not the operation on the operation part 102 is continuously progressed. In a case in which the CPU 21 as the acceptance unit 27 has accepted the progress of the continuous operation on the operation part 102, the processing proceeds to step S126. On the other hand, in a case in which the CPU 21 as the acceptance unit 27 has not accepted the progress of the continuous operation on the operation part 102, the processing proceeds to step S124.

In step S124, the CPU 21 as the acceptance unit 27 determines whether or not a reversal of the operation on the operation part 102 has been accepted. In a case in which the CPU 21 as the acceptance unit 27 has accepted the reversal of the operation on the operation part 102, the processing proceeds to step S125. On the other hand, in a case in which the CPU 21 has not accepted the reversal of the operation on the operation part 102, the processing returns to step S123.

In step S125, the CPU 21 as the display unit 26 reverses the current display.

In step S126, the CPU 21 as the display unit 26 changes the display of the screen according to the progress of the operation on the operation part 102. Here, in a case in which the speed of the operation changes, the portion of the relevant information to be displayed on the screen may be changed according to the speed of progress of the operation on the operation part 102.

In step S127, the CPU 21 as the acceptance unit 27 determines whether or not cancellation of the operation on the operation part 102 has been accepted. Here, in a case in which the CPU 21 as the acceptance unit 27 has accepted the cancellation of the operation on the operation part 102, the processing returns to step S120. On the other hand, in a case in which the CPU 21 as the acceptance unit 27 has not accepted the cancellation of the operation on the operation part 102, the processing proceeds to step S128.

In step S128, the CPU 21 as the acceptance unit 27 determines whether or not information indicating that the operation on the operation part 102 has reached a prescribed value has been received. In a case in which the CPU 21 as the acceptance unit 27 has received the information indicating that the operation on the operation part 102 has reached the prescribed value, the processing proceeds to step S129. On the other hand, in a case in which the CPU 21 as the acceptance unit 27 has not received the information indicating that the operation on the operation part 102 has reached the prescribed value, the processing returns to step S126.

In step S129, the CPU 21 as the acceptance unit 27 accepts execution of the predetermined function. Since an example of the predetermined function in the present embodiment is the copying function, in a case in which the CPU as the acceptance unit 27 has received the information indicating that the operation on the operation part 102 by the user has reached the prescribed value, the CPU 21 as the acceptance unit 27 accepts execution of the copying function that is the predetermined function. When the information processing device 20 accepts execution of the copying function that is the predetermined function, the image forming device 30 starts execution of the copying function that is the predetermined function based on an instruction from the information processing device 20.

As described above, with the information processing device 20 according to the present embodiment, the relevant information can be switched in the display of the screen even when the user performs the continuous operation on the operation part. Accordingly, since the relevant information displayed on the screen can be switched, the user can view not only a part of the relevant information but also the relevant information that does not fit within the screen.

Second Embodiment

Next, a second embodiment will be described. In the present embodiment, a case in which there are a plurality of types of relevant information related to a predetermined function will be described in detail. Since an information processing system 50 according to the present embodiment is based on the information processing system 10 according to the first embodiment, configurations, functions, operations, and the like common to those of the information processing system 10 according to the first embodiment are denoted by the same reference numerals as those of the first embodiment, and a detailed description thereof will be omitted.

As shown in FIG. 1, the information processing system 50 according to the present embodiment has the same schematic configuration as that of the information processing system 10 according to the first embodiment. An information processing device 60 is also connected to an image forming device 30 via a network 40.

Since a hardware configuration of the information processing device 60 according to the present embodiment is the same as the hardware configuration of the information processing device 20 according to the first embodiment shown in FIG. 2, a description thereof will be omitted.

A functional configuration of the information processing device 60 according to the present embodiment is also the same as the functional configuration of the information processing device 20 according to the first embodiment as shown in FIG. 3. The information processing device 60 includes a display unit 66 and an acceptance unit 67 as the functional configuration. Here, only a different function from the first embodiment will be described, and a description of the same functions as those of the first embodiment will be omitted.

In the present embodiment, the information processing device 60 switches between and displays first information and second information as the relevant information related to the predetermined function. Both the first information and the second information are the relevant information related to the predetermined function, but the second information is information of a type different from that of the first information. The first information is, for example, setting information regarding the predetermined function or information regarding an initial setting. As will be described below with reference to FIG. 7, a plurality of types of second information may further exist.

Figure 6:
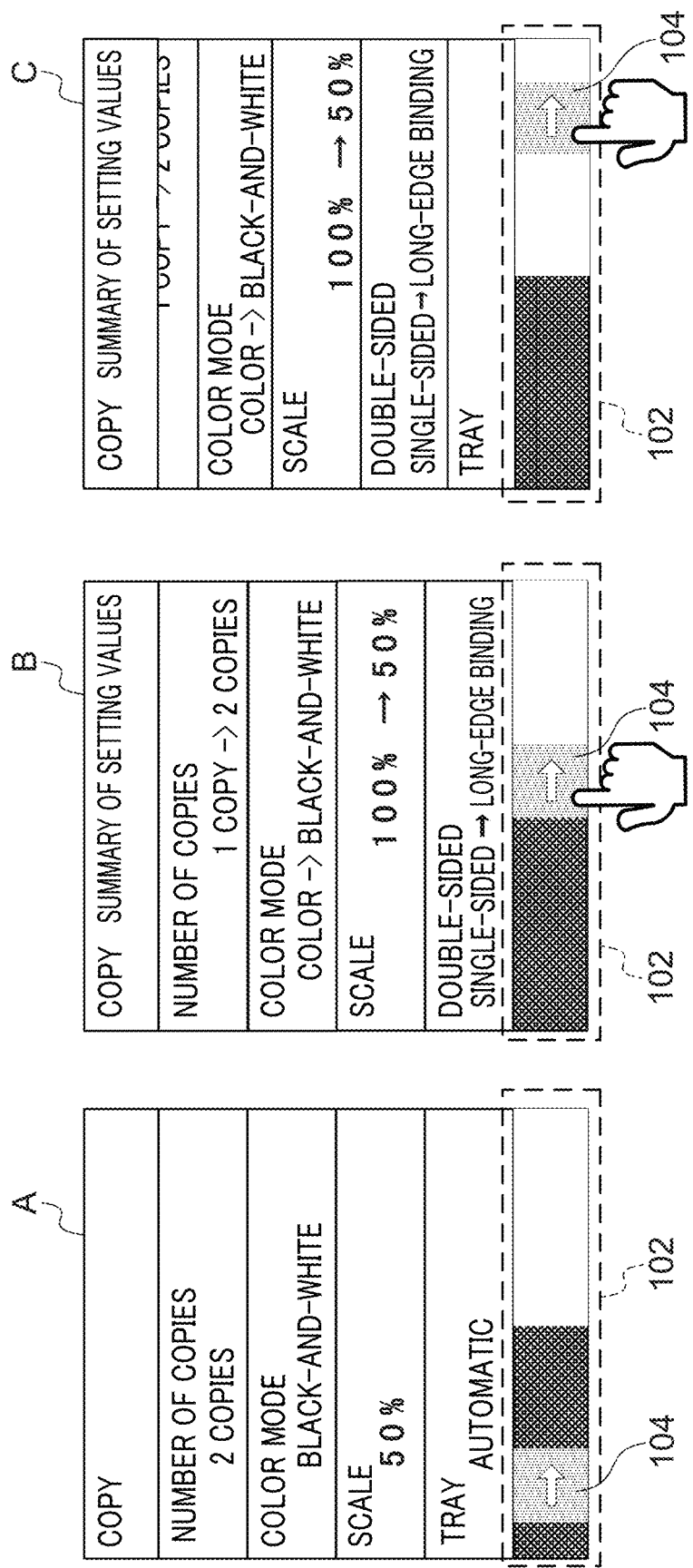
FIG. 6 is a diagram showing an example of display of the information processing device 60 according to a second embodiment.

FIG. 6 is a diagram showing an example of display of the information processing device 60 according to the second embodiment. In the example shown in FIG. 6, the relevant information shown in FIG. 6A is the first information, and the relevant information shown in FIGS. 6B and 6C is the second information. In FIG. 6A, information regarding a setting when the predetermined function is executed is displayed, whereas in FIGS. 6B and 6C, information of a change of the information regarding the setting displayed in FIG. 6A is displayed. As described above, the relevant information displayed in FIG. 6A and the relevant information displayed in FIGS. 6B and 6C are different types of relevant information.

The display unit 66 displays the first information before the acceptance unit 67 accepts the start of the operation on an operation part 102, and displays the second information until the acceptance unit 67 accepts the execution of the predetermined function after accepting the start of the operation on the operation part 102.

In addition, the display unit 66 displays information indicating a change from the initial setting for executing a predetermined function as the second information. In FIGS. 6B and 6C showing the second information, an item changed from the initial setting of the predetermined function is displayed in such a way that a change in setting content before and after the change can be easily understood. For example, the number of copies is changed from one copy to two copies in the initial setting in FIG. 6B. In addition, it can be confirmed that the color mode is changed from color printing of the initial setting to black-and-white, the scale is changed from 100% of the initial setting to 50%, and a setting for double-sided printing is changed from single-sided printing of the initial setting to a long-edge binding of double-sided printing. In the example shown in FIG. 6, the relevant information shown in FIG. 6A is the first information, and the relevant information shown in FIGS. 6B and 6C is the second information.

In addition, in a case in which the acceptance unit 67 accepts the reversal of the operation on the operation part 102 and accepts the maintenance of the operation during a period from when the acceptance unit 67 accepts the start of the operation on the operation part 102 and to when the acceptance unit 67 accepts the execution of the predetermined function, the display unit 66 keeps the second information displayed.

The reversal of the operation on the operation part 102 is as described in the first embodiment. A case in which the maintenance of the operation is accepted means a state in which the acceptance unit 67 remains accepting the operation by the user. For example, it means a state in which the finger of the user is not released from the operation part 102 and an operation button 104 on the screen such as a touch panel, and the finger of the user is in a state of touching the operation part 102 and the operation button 104 on the screen such as a touch panel.

Furthermore, in a case in which the acceptance unit 67 has accepted cancellation of the operation on the operation part 102 by the user during a period from acceptance of the start of the operation on the operation part 102 by the user and acceptance of the execution of the predetermined function, the display unit 66 returns the display of the second information to the display of the first information.

A case in which the cancellation of the operation on the operation part 102 by the user has been accepted means a state in which the acceptance unit 67 does not accepted the operation by the user. For example, it means a state in which the finger of the user is released from the operation part 102 and the operation button 104 on the screen such as a touch panel, that is, a state in which the finger of the user does not touch the operation part 102 and the operation button 104 on the screen such as a touch panel.

Returning the display of the second information to the display of the first information refers to changing the type of relevant information displayed on the screen. For example, in the example shown in FIG. 6, the display of FIG. 6B and FIG. 6C is returned to the display of FIG. 6A displayed before the acceptance unit 67 accepts the start of the operation on the operation part 102.

In addition, in a case in which the acceptance unit 67 accepts the execution of the predetermined function by the operation on the operation part 102 and then accepts cancellation of the operation on the operation part 102, the display unit 66 keeps the second information displayed.

After the acceptance unit 67 accepts the execution of the predetermined function by the operation on the operation part 102, the display unit 66 maintains a state in which the second information is displayed without returning the display of the screen to the first information even in a case in which the cancellation of the operation on the operation part 102 by the user is accepted.

Maintaining the state in which the second information is displayed means not setting the relevant information displayed on the screen to the first information. In the example shown in FIG. 6, the screen shown in FIGS. 6B and 6C is continuously displayed without returning from the display of FIGS. 6B and 6C to the display of FIG. 6A displayed before the acceptance unit 67 accepts the start of the operation on the operation part 102.

In a case in which there are a plurality of types of second information, the display unit 66 changes the second information to be displayed on the screen according to the speed of the operation on the operation part 102. As described above, there may be a plurality of types of second information as the relevant information related to the predetermined function, and the second information may be not only the information related to the setting for execution of the predetermined function but also information related to an effect or the like in a case in which the predetermined function is executed.

Figure 7:
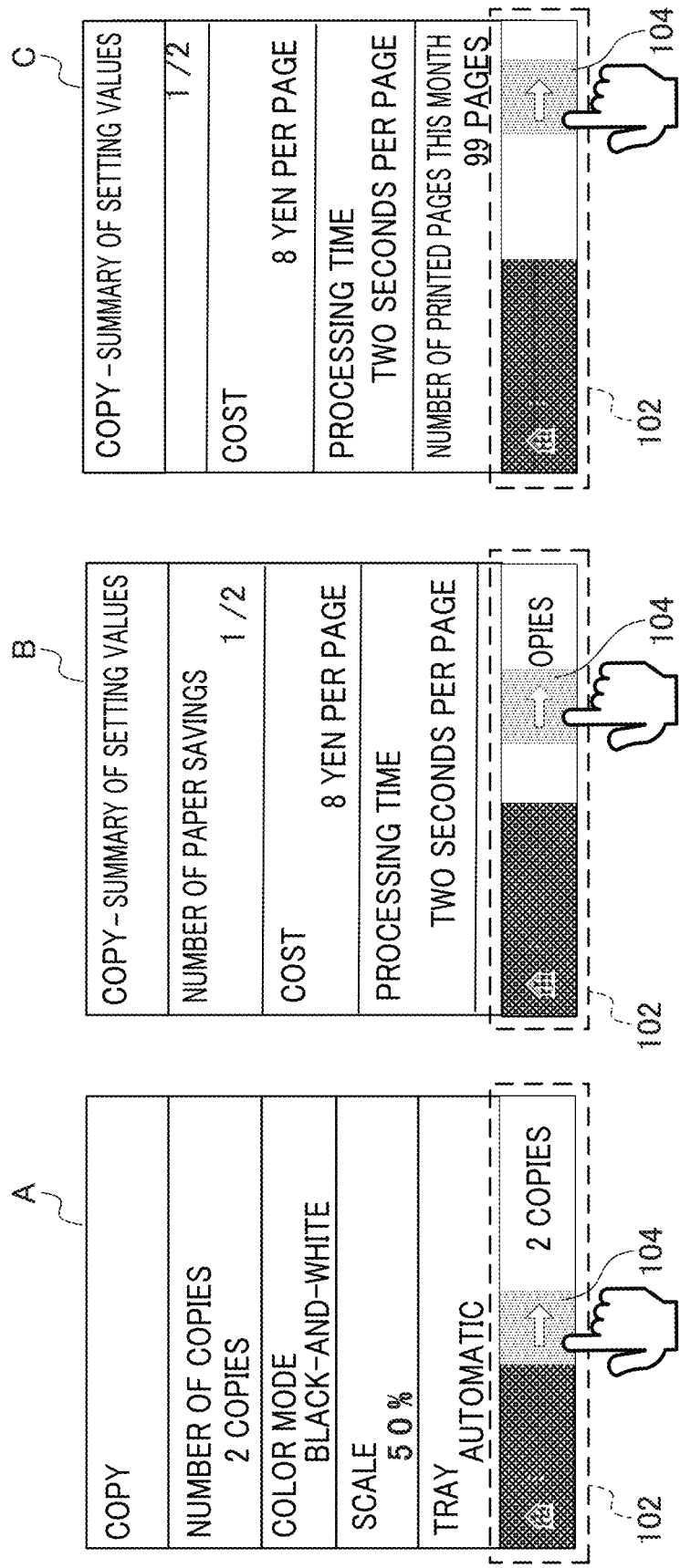
FIG. 7 is a diagram showing another example of second information according to the second embodiment.

FIG. 7 is a diagram showing another example of the second information as one of variations of the second information in the information processing system 50 according to the present embodiment. In the example shown in FIG. 7, the predetermined function is a FAX function, and in FIGS. 7B and 7C, the number of times transmission to a designated transmission destination is performed, a transmission destination region assumed from the designated transmission destination, and relevant information regarding a cost of the current transmission are displayed as the second information. A difference from the example shown in FIG. 6 is that the relevant information shown in FIGS. 6B and 6C is the relevant information before and after the change of the setting information shown in FIG. 4A, whereas information regarding a result or the like of the execution of the predetermined function, which is not directly related to the relevant information displayed in FIG. 7A, is displayed in FIGS. 7B and 7C.

In addition, in a case in which the acceptance unit 67 has received information indicating that the speed of the operation on the operation part 102 by the user is higher than a predetermined speed, the display unit 66 changes the second information to be displayed on the screen. Changing the second information to be displayed on the screen means, for example, displaying the second information shown in FIGS. 6B and 6C shown in FIG. 6 in a case in which the operation on the operation part 102 is lower than the predetermined speed, and displaying the second information shown in FIGS. 7B and 7C in a case in which the speed of the operation is higher than the predetermined speed.

In addition, the display unit 26 displays the second information on the screen in a case in which the acceptance unit 67 has accepted an operation whose speed is lower than the predetermined speed, and does not display the second information on the screen in a case in which the acceptance unit 67 has accepted an operation whose speed is higher than the predetermined speed. The display unit 66 can change the type of information displayed on the screen according to the speed of the operation accepted by the acceptance unit 67. This is only an example, and for example, a configuration in which the second information is displayed on the screen in a case in which the acceptance unit 67 has accepted an operation whose speed is lower than the predetermined speed, and the second information is not displayed on the screen in a case in which the acceptance unit 67 has accepted an operation whose speed is higher than the predetermined speed may be applied.

Figure 8:
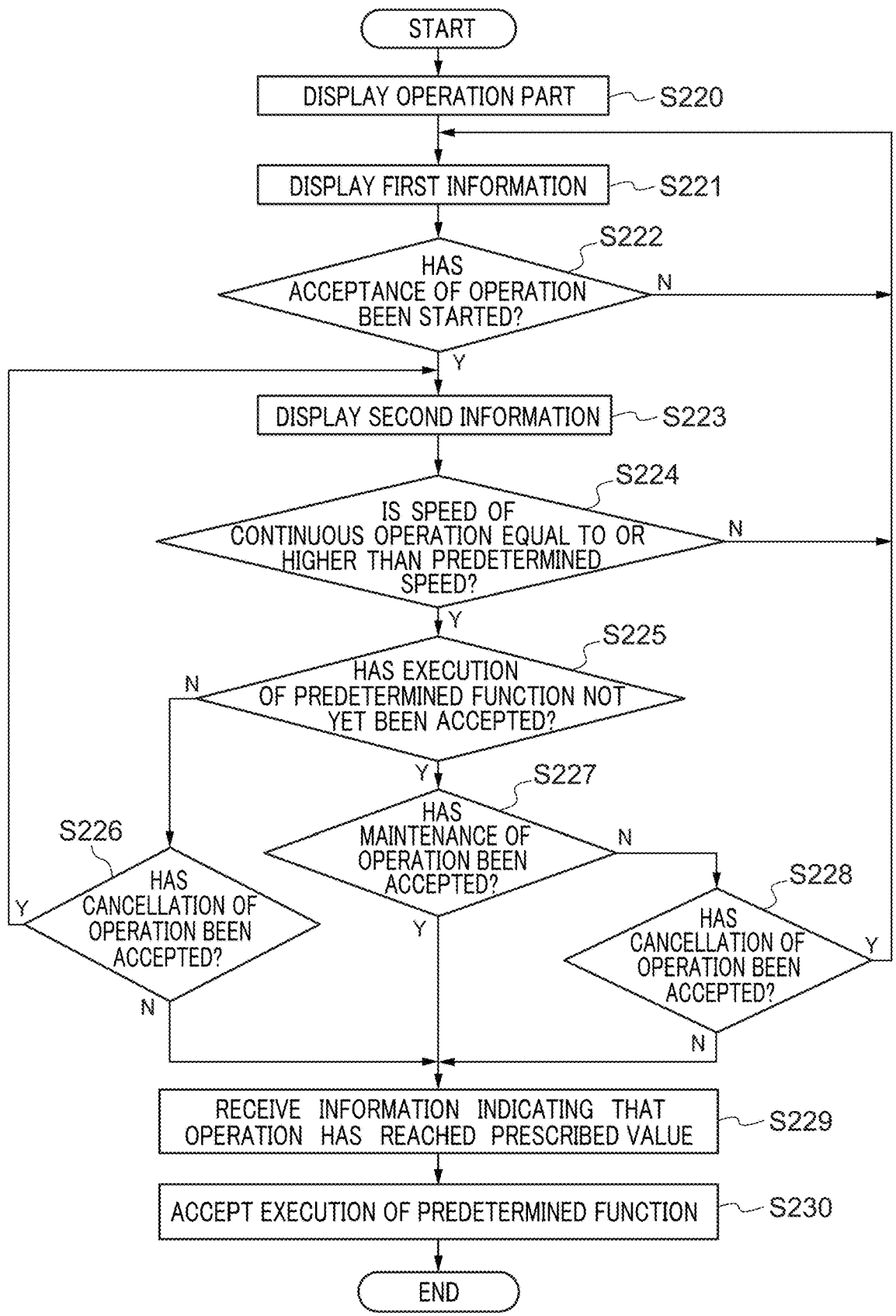
FIG. 8 is a flowchart showing processing in the information processing device 60 according to the second embodiment.

FIG. 8 is a flowchart showing processing in the information processing device 60 according to the present embodiment. A description of the same points as the processing shown in FIG. 5 and the basic processing of the information processing device 60 according to the present embodiment will be omitted. In FIG. 8, processing in the information processing device 60 in a case in which the first information and the second information are switched and displayed as the relevant information related to the predetermined function will be described.

In step S220, the CPU 21 displays the operation part 102 for executing the predetermined function on the screen of the display 25 as the display unit 66.

In step S221, the CPU 21 as the display unit 66 displays the first information on the screen of the display 25.

In step S222, the CPU 21 as the acceptance unit 67 determines whether or not the acceptance of the operation on the operation part 102 has started. In a case in which the CPU 21 as the acceptance unit 67 has started acceptance of an operation on the operation part 102 by the user, the processing proceeds to step S223. On the other hand, in a case in which the CPU 21 as the acceptance unit 67 has not started the acceptance of the operation on the operation part 102, the processing returns to step S221.

In step S223, the CPU 21 as the display unit 66 displays the second information on the screen of the display 25.

In step S224, the CPU 21 as the acceptance unit 67 determines whether or not the speed of the accepted continuous operation is equal to or higher than a predetermined speed. In a case in which the CPU 21 as the acceptance unit 67 determines that the speed of the accepted continuous operation is equal to or higher than the predetermined speed, the processing proceeds to step S225. On the other hand, in a case in which the CPU 21 as the acceptance unit 67 determines that the speed of the accepted continuous operation is lower than the predetermined speed, the processing returns to step S221, and the CPU 21 as the display unit 66 returns the information displayed on the screen of the display 25 from the second information to the first information.

In step S225, the CPU 21 as the acceptance unit 67 determines whether or not the execution of the predetermined function has not yet been accepted. In a case in which the CPU 21 as the acceptance unit 67 has not yet accepted the execution of the predetermined function, the processing proceeds to step S227. On the other hand, in a case in which the CPU 21 as the acceptance unit 67 has accepted the execution of the predetermined function, the processing proceeds to step S226.

In step S226, the CPU 21 as the acceptance unit 67 determines whether or not cancellation of the operation on the operation part 102 by the user has been accepted. In a case in which the CPU 21 as the acceptance unit 67 has accepted the cancellation of the operation on the operation part 102 by the user, the processing returns to step S223. On the other hand, in a case in which the CPU 21 as the acceptance unit 67 has not accepted that cancellation of the operation on the operation part 102 by the user, the processing proceeds to step S229.

In step S227, the CPU 21 as the acceptance unit 67 determines whether or not maintenance of the operation on the operation part 102 has been accepted. In a case in which the CPU 21 as the acceptance unit 67 has accepted the maintenance of the operation on the operation part 102, the processing proceeds to step S229. On the other hand, in a case in which the CPU 21 as the acceptance unit 67 has not accepted the maintenance of the operation on the operation part 102, the processing proceeds to step S228.

In step S228, the CPU 21 as the acceptance unit 67 determines whether or not the cancellation of the operation on the operation part 102 by the user has been accepted. In a case in which the CPU 21 as the acceptance unit 67 has accepted the cancellation of the operation on the operation part 102 by the user, the processing returns to step S221, and what is displayed on the screen of the display 25 is changed from the second information to the first information. On the other hand, in a case in which the CPU 21 as the acceptance unit 67 has not accepted that cancellation of the operation on the operation part 102 by the user, the processing proceeds to step S229.

In step S229, the CPU 21 as the acceptance unit 67 receives information indicating that the operation on the operation part 102 has reached a prescribed value.

In step S230, the CPU 21 as the acceptance unit 67 accepts execution of the predetermined function. Since an example of the predetermined function in the present embodiment is the copying function, in a case in which the CPU as the acceptance unit 67 has received the information indicating that the operation on the operation part 102 by the user has reached the prescribed value, the CPU 21 as the acceptance unit 67 accepts execution of the copying function that is the predetermined function. When the information processing device 60 accepts execution of the copying function that is the predetermined function, the image forming device 30 starts execution of the copying function that is the predetermined function based on an instruction from the information processing device 60.

As described above, with the information processing device 60 according to the present embodiment, in a case in which a plurality of types of information such as the first information and the second information exists as the relevant information related to the predetermined function, the first information and the second information can be switched and displayed according to the operation performed during a period from the start of the operation by the user to the acceptance of the execution of the predetermined function.

For a variation of the predetermined operation by the user, two other examples will be described in addition to the example shown in FIG. 6. The variation of the predetermined operation shown in FIGS. 9 and 10 may be applied to either the first embodiment or the second embodiment.

Figure 9:
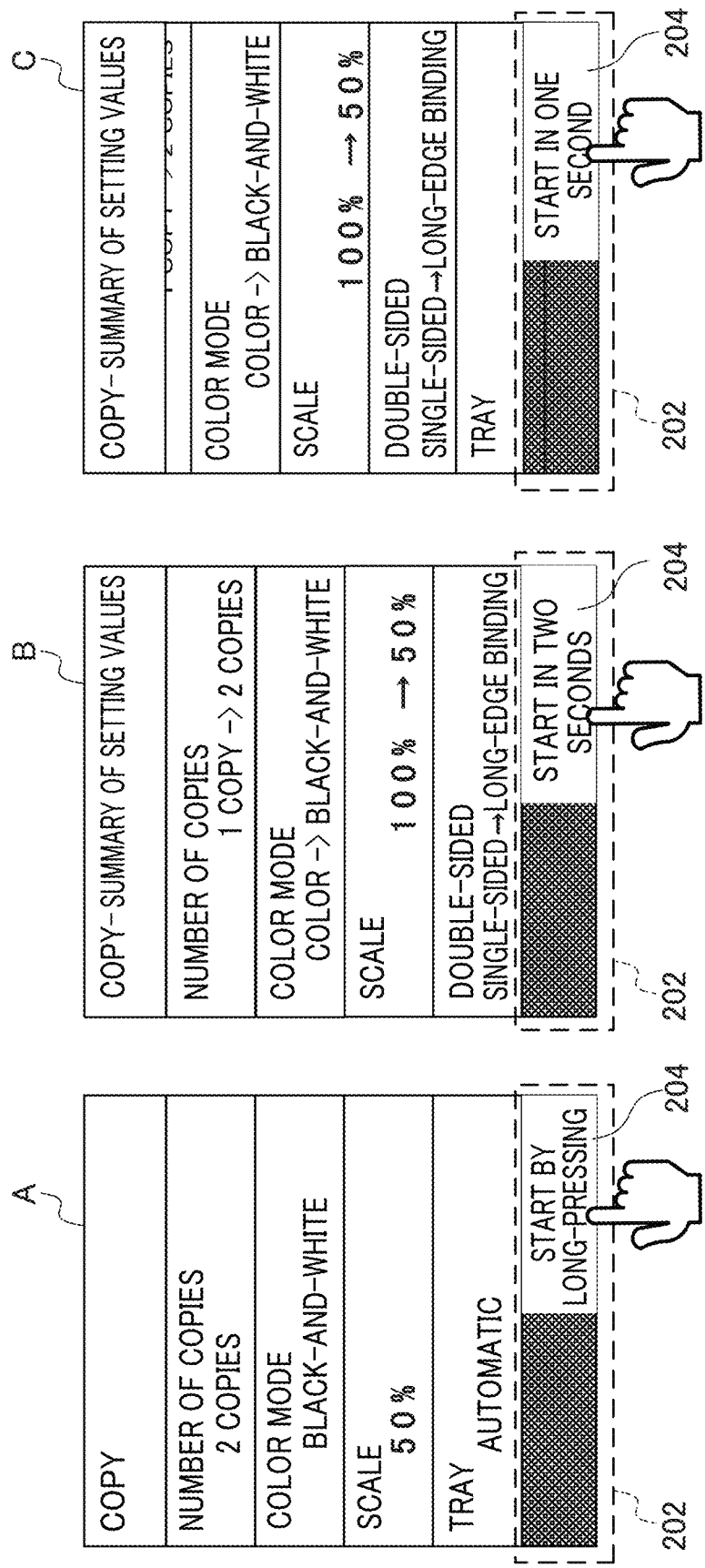
FIG. 9 is a diagram showing another example of a variation of a predetermined operation.

FIG. 9 is a diagram showing another example of the variation of the predetermined operation. As shown in FIG. 9, one of variations of the continuous operation performed by the user is an operation of long-pressing an operation button 204 in an operation part 202 with the finger.

The continuous operation on the operation part in the example of FIG. 9 means that the user keeps long-pressing the operation button 204 during a predetermined time as displayed on the operation button 204. In FIG. 9, by pressing the operation button 204 until the predetermined time displayed in the operation button 204 elapses, a predetermined prescribed value is reached, and the information processing device 20 and the information processing device 60 accept the execution of the predetermined function.

"Start by long-pressing" is displayed in the operation button 204 in FIG. 9A showing a screen before the user starts the operation. "Start in two seconds" and "start in one second" are displayed in the operation button 204 in FIGS. 9B and 9C displayed after the user starts an operation of long-pressing the operation button 204 as the operation. Here, the display of "in two seconds" and "in one second" indicates a pressing time until the execution of the predetermined function is accepted. When the operation is progressed until the time displayed in the operation button 204 elapses, the operation reaches the predetermined prescribed value, and the information processing device 20 and the information processing device 60 accept the execution of the predetermined function. The change in display of the screen according to the progress of the predetermined operation is the same as in the example shown in FIG. 6.

Figure 10:
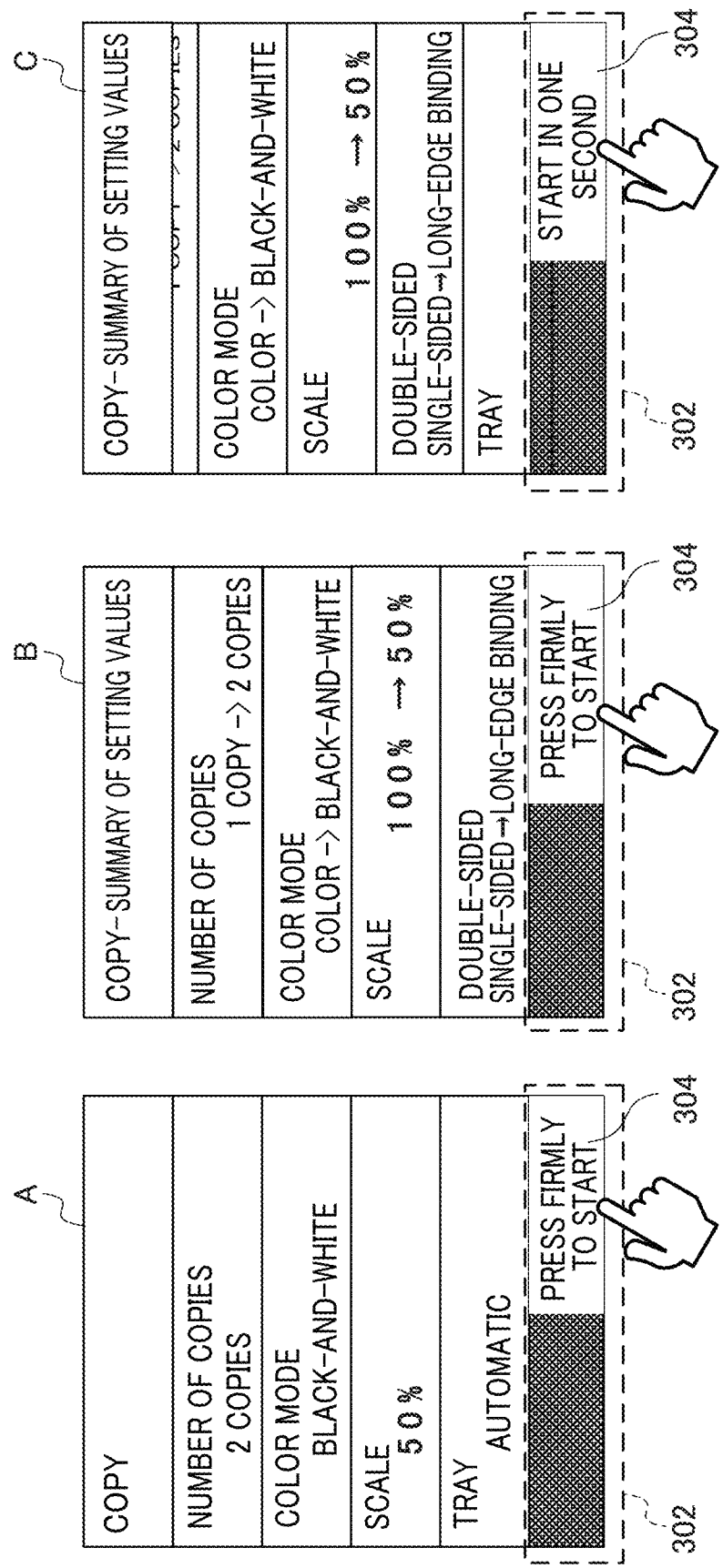
FIG. 10 is a diagram showing still another example of the variation of the predetermined operation.

Furthermore, another example of the variation of the predetermined operation by the user will be described. FIG. 10 is a diagram showing still another example of the display according to the present embodiment. In the example of FIG. 10, a continuous operation on an operation part 302 means that the user firmly presses an operation button 304 with the finger. In FIG. 10, by firmly pressing the operation button 304 until the predetermined time displayed in the operation button 304 elapses, a predetermined prescribed value is reached, and the information processing device 20 and the information processing device 60 accept the execution of the predetermined function.

"Press firmly to start" is displayed in the operation button 304 shown in FIG. 10A showing a screen before the user starts the operation. "Press firmly to start" and "start in one second" are displayed in the operation button 304 in FIGS. 10B and 10C displayed after the user starts an operation of firmly pressing the operation button 304. The display of "in one second" indicates a pressing time until the execution of a predetermined function is accepted. When the operation of continuously firmly pressing the operation button 304 until the time displayed in the operation button 304 elapses is progressed, the operation reaches the predetermined prescribed value, and the information processing device 20 and the information processing device 60 accept the execution of the predetermined function. The change in display of the screen according to the progress of the predetermined operation is the same as in the example shown in FIGS. 6 and 9.

The screen transition or the change in switching of the screen of the display according to the progress of the predetermined operation is not limited to the example shown in FIG. 6. Reversing the operation from the state of FIG. 9C means returning to the screen displayed in the state of FIG. 9B or the state of FIG. 9A, and reversing the operation from the state of FIG. 9B includes returning to the display in FIG. 9A. Also in the example shown in FIG. 10, reversing the operation from the state of FIG. 10C means returning to the screen displayed in the state of FIG. 10B or the state of FIG. 10A, and reversing the operation from the state of FIG. 10B includes returning to the display in FIG. 10A.

In the present embodiment, a form in which the information processing program is installed in the storage unit 23 has been described, but the present invention is not limited thereto. The information processing program according to the present embodiment may be provided in a form recorded in a computer-readable storage medium. For example, the information processing program according to the present embodiment may be provided in a form of being recorded in an optical disk such as a compact disc (CD)-ROM or a digital versatile disc (DVD)-ROM, or in a form of being recorded in a semiconductor memory such as a universal serial bus (USB) memory or a memory card. Furthermore, the information processing program according to the present embodiment may be acquired from an external device via a communication line connected to the communication I/F 24.

In the embodiments described above, the processor refers to a processor in a broad sense, and includes a general-purpose processor (for example, a central processing unit (CPU)) or a dedicated processor (for example, a graphics processing unit (GPU), an application specific integrated circuit (ASIC), a field programmable gate array (FPGA), or a programmable logic device).

In addition, the operation of the processor in the embodiments described above may be performed not only by one processor but also by a plurality of processors existing at physically separated positions in cooperation. In addition, the order of the respective operations of the processor is not limited to the order described in each embodiment described above, and may be changed, if appropriate.

The disclosure of Japanese Patent Application No. 2021-023746 is incorporated herein by reference in its entirety. All documents, patent applications, and technical standards mentioned herein are incorporated herein by reference to the same extent as if each individual document, patent application, and technical standard were specifically and individually stated.

The invention claimed is:

1. An information processing device comprising:
a processor,
wherein the processor:
causes an operation part, for executing a predetermined function and a portion of relevant information related to the predetermined function, to be displayed on a screen of a display,
accepts execution of the predetermined function by a continuous operation on the operation part, and
changes a portion of the relevant information to be displayed on the screen by scrolling according to progress of the continuous operation on the operation part during a period from a start of the operation on the operation part to the acceptance of the execution, and
wherein the operation part is configured to be slid with an operation button by a user in a first direction, and a direction in which the relevant information is scrolled is a second direction that is not parallel to the first direction, and relevant information that does not fit within the screen is gradually displayed in the second direction; and
sequentially changes the relevant information that is not visible in the screen all at once to be displayed on the screen by scrolling according to the progress of the continuous operation made further sliding with the operation button on the operation part in the first direction.

2. The information processing device according to claim 1, wherein the processor reverses a change of display of the screen in a case in which the operation on the operation part is reversed during the period from the start of the operation on the operation part to the acceptance of the execution.

3. The information processing device according to claim 1, wherein the processor links a speed of the operation on the operation part with a speed for sequentially changing the portion to be displayed on the screen.

4. The information processing device according to claim 1, wherein:
the relevant information includes first information and second information different from the first information, and
the processor:
causes the first information to be displayed on the screen before the start of the operation on the operation part, and
causes the second information to be displayed on the screen during the period from the start of the operation on the operation part to the acceptance of the execution.

5. The information processing device according to claim 4, wherein the processor causes information indicating a change from an initial setting for executing the predetermined function to be displayed as the second information.

6. The information processing device according to claim 4, wherein the processor keeps the second information displayed in a case in which the operation on the operation part is reversed and the operation is maintained during the period from the start of the operation on the operation part to the acceptance of the execution.

7. The information processing device according to claim 4, wherein the processor returns the display from the second information to the first information in a case in which the operation on the operation part is canceled during the period from the start of the operation on the operation part to the acceptance of the execution.

8. The information processing device according to claim 4, wherein the processor keeps the second information displayed in a case in which the operation on the operation part is canceled after the execution of the predetermined function is accepted by the operation on the operation part.

9. The information processing device according to claim 4, wherein:
there are a plurality of types of the second information, and
the processor changes the second information to be displayed on the screen according to a speed of the operation on the operation part.

10. The information processing device according to claim 9, wherein the processor:
causes the second information to be displayed on the screen in a case in which the speed of the operation is lower than a predetermined speed, and does not cause the second information to be displayed on the screen in a case in which the speed of the operation is equal to or higher than the predetermined speed.

11. A non-transitory computer-readable storage medium storing an information processing program that is executable by a computer to:
cause an operation part for executing a predetermined function and a portion of relevant information related to the predetermined function to be displayed on a screen of a display;
accept execution of the predetermined function by a continuous operation on the operation part; and
change a portion of the relevant information to be displayed on the screen by scrolling according to progress of the continuous operation on the operation part during a period from a start of the operation on the operation part to the acceptance of the execution,
wherein the operation part is configured to be slid with an operation button by a user in a first direction, and a direction in which the relevant information is scrolled is a second direction that is not parallel to the first direction, and relevant information that does not fit within the screen is gradually displayed in the second direction; and
sequentially change the relevant information that is not visible in the screen all at once to be displayed on the screen by scrolling according to the progress of the continuous operation made further sliding with the operation button on the operation part in the first direction.

* * * * *